July 1, 1947.  C. C. S. LE CLAIR  2,423,329
OIL FILTRATION
Filed April 15, 1943   3 Sheets-Sheet 1
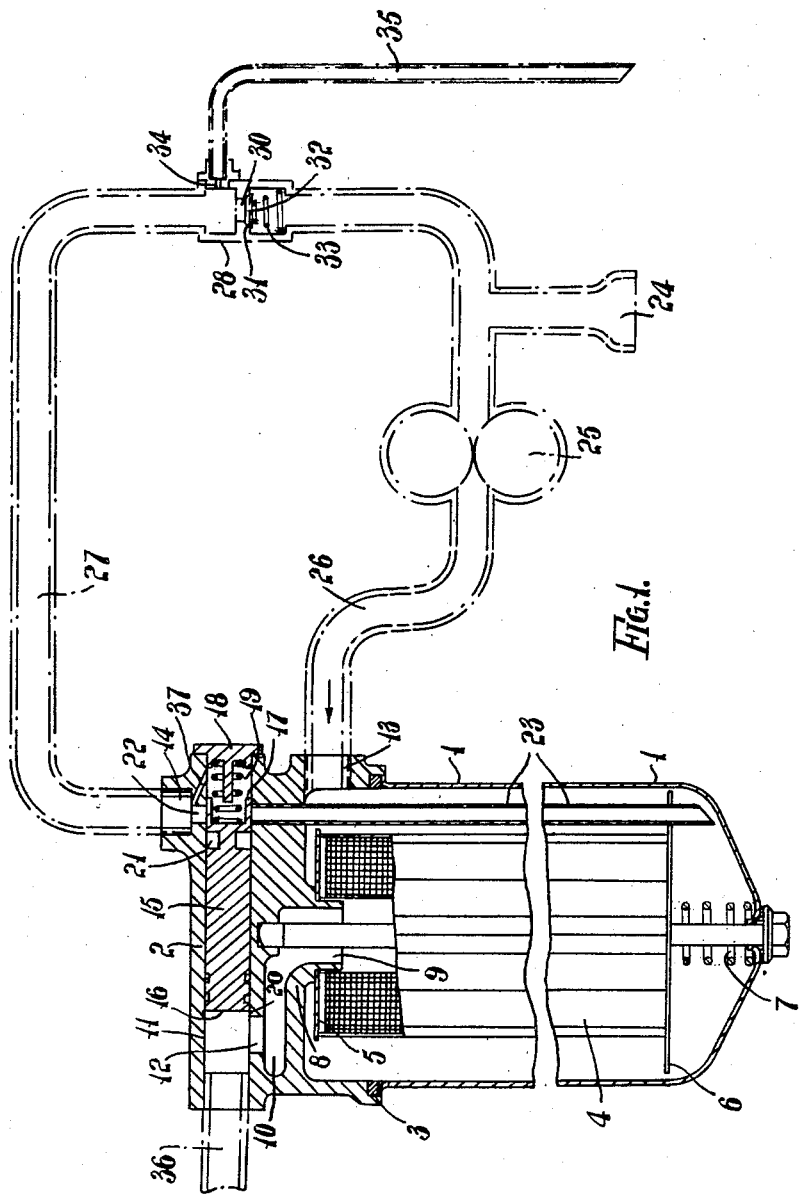
Inventor.
Camille Clare Sprankling LeClair
By Williams, Bradbury & Hinkle
Attorneys

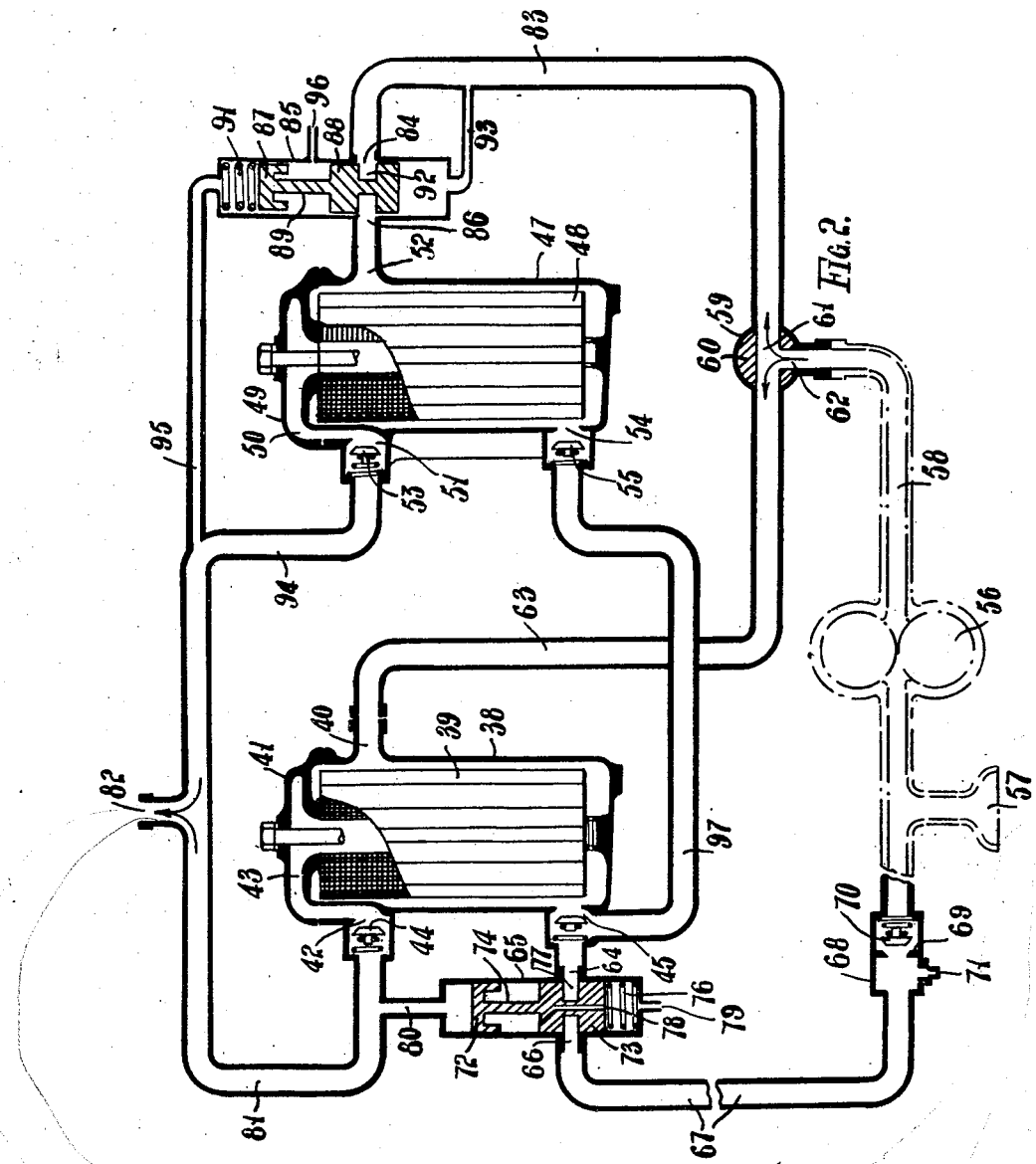

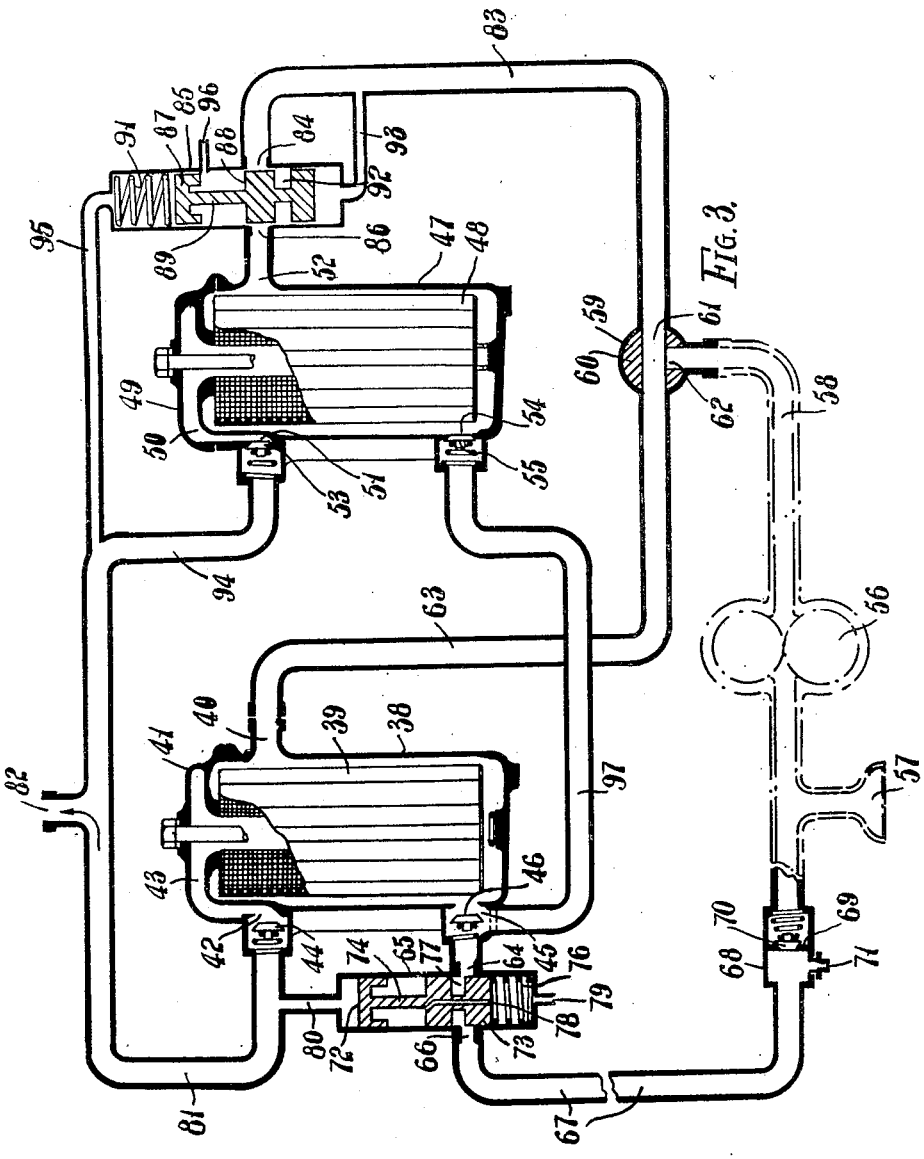

Patented July 1, 1947

2,423,329

UNITED STATES PATENT OFFICE 2,423,329

OIL FILTRATION

Camille Clare Sprankling Le Clair,
London, England

Application April 15, 1943, Serial No. 483,158
In Great Britain January 24, 1942

9 Claims. (Cl. 210—150)

This invention relates to oil filtration systems and particularly to those dealing with engine oil.

The resistance to flow of lubricating oil through a filter when the oil is cold may be extremely high compared with the resistance to flow when it is hot. If, therefore, a filter be provided sufficiently large to pass all the oil when cold, it will not only be unnecessarily large to pass the requisite oil when hot, but also will generally be impossibly large to be accommodated within the space usually available.

For this reason, it is usual to provide a filter large enough to accommodate the full flow when the oil is hot and a by-pass valve which permits part of the oil to be by-passed to the bearings when the oil is cold.

With such an arrangement, however, there is some risk that injurious material may be carried to the bearings by the oil which does not pass through the filter element. Furthermore, while the by-pass valve is open, the movement of oil relative to the filter element is slow and the passage of oil through it is unduly delayed.

Since, however, the engine bearings actually require a smaller volume of oil when cold than when hot, it is not necessary to pass the remainder of the pump discharge, i. e., the amount which passes through the by-pass valve, to the bearings. If arrangements were made whereby the full designed operating pressure were applied to the bearings when cold and any excess oil were spilled back to the sump, it would constitute an improvement on existing designs since no unfiltered oil would reach the bearings. Moreover, it has been found by experiment that sufficient oil to maintain the full working pressure can be put through a filter of feasible dimensions without undue pressure difference.

This process of getting the requisite amount of oil through the filter element is facilitated if a sharp circulation over the filter surface can be maintained and is further facilitated if the temperature of the oil can be raised even though it may be only locally and not immediately throughout the whole system.

Hence, the primary object of this invention is to provide means whereby the whole of the lubricating oil flowing to the bearings of an engine shall be filtered irrespective of the temperature of the oil.

A second object of the invention is to provide means whereby only as much oil as is required by the bearings shall pass through the filter element, thus enabling a minimum size of filter to be used with maximum efficiency.

A third object of the invention is to provide that the oil passing the relief valve or its equivalent may be circulated around the filter element as rapidly as possible.

A fourth object of this invention is to provide that the oil circulated so as to by-pass the filter element may be rapidly heated.

A fifth object of the invention is to provide means whereby an auxiliary filter may be used to assist the main filter during cold working conditions.

A further object of the present invention is to provide an oil filtration system comprising a source of oil supply, a means for circulating oil through the system, at least one filter comprising a filter casing, a filter element contained therein, an oil inlet branch connected to the said circulating means, a filtrate outlet branch connected to the place of use of the oil, a secondary outlet for unfiltered oil adapted to be connected by a recirculating connection back to the inlet side of the circulating means, and means in this connection whereby the amount of flow can be controlled in accordance with the pressure in the filtrate outlet to the said place of use of the oil in such a manner that no unfiltered oil can reach the said place of use.

A still further object of the present invention is to provide a filtration system for lubricating oil wherein a main filter unit controlled by a control valve and at least one auxiliary filter unit controlled by a control valve of similar construction are incorporated, the arrangement being such that when circumstances demand it, i. e., when the resistance of the main filter rises to or beyond a predetermined value, the auxiliary filter automatically comes into operation to relieve the main filter.

Two constructional forms of the present invention, both applied to filtration systems for filtering the oil used to lubricate the bearings of internal combustion engines, are shown, by way of example, on the accompanying sheets of drawings, whereon:

Fig. 1 shows an engine oil filtration system which comprises a single filter unit and an associated control valve unit;

Fig. 2 shows, diagrammatically, a modified oil filtration system which comprises a main filter unit and its associated control valve unit and an auxiliary filter unit and its associated control valve unit, the control valves being shown in the positions they occupy when the oil is cold; and Fig. 3 is a diagrammatic view corresponding to Fig. 2, but shows the control valves in the position they occupy when the oil is hot.

Referring first to Fig. 1:

The engine oil filtering system shown in Figure 1 includes one filter unit only which is of known construction and comprises a filter casing 1 detachably attached to a head 2. An annular joint 3 is arranged between the head and casing in order to prevent the leakage of oil from the filter. The filter element 4, also of known construction, is held in position within the casing between an upper pressure plate 5 and a lower pressure plate 6, which is constantly urged upwards by a spring 7. The upper pressure plate is fitted upon a boss 8 formed on the head 2 and having outlet passages 9 and 10. The filter head is also formed with a bore 11 which passes right through the head and communicates with the outlet passage 10 through a filtrate outlet port 12. The filter is of the type in which the oil flows from the casing inwardly through the filter element 4 into the interior thereof and then out of the element through the outlet passages 9 and 10 and the port 12. The oil enters the filter casing through a main inlet branch 13, and an auxiliary outlet 14 is also formed in the head. A control valve 15 is slidably arranged in the bore 11, the said valve being formed to act as a piston at its end 16 and as a piston valve at its end 17. The right hand end of the bore 11 is closed by means of a screwed plug 18 and the valve 15 is constantly urged to the left in the cylinder bore by a coil spring 19 which bears at one end against the plug 18. The opposite end of the spring 19 is fitted in a recess formed in the adjacent end of the piston valve 17 and the end of the spring bears against the end wall of the recess. The movement of the control valve to the left is limited by a split ring 20 which thus prevents the piston end 16 closing the outlet port 12. The piston valve end 17 is formed with a annular recess 21 which, when the control valve is moved to the right from the position shown in Fig. 1, by the pressure in the pressure end of the cylinder overcoming the resistance of the spring 19, is adapted to provide communication between an auxiliary outlet port 22 and the upper end or mouth of a pipe 23 which is fixed in the head 2 and extends, substantially parallel to the filter element 4, almost to the bottom of the filter casing 1. The pressure at which this communication occurs is the designed working pressure of the system.

A pump intake 24 projects into the engine sump (not shown) and is connected to the suction side of a pump 25. The discharge side of the pump is connected by means of a pipe 26 to the main inlet 13 of the filter unit. A return pipe 27 connects the auxiliary outlet 14 to the pump intake 24 and the suction side of the pump. At some convenient point in the said pipe 27 there is fitted a valve seat 31 onto which a relief valve 32 is normally pressed under the action of a spring 33 to close the port 30. This valve is arranged to open outwards away from the filter and the loading of the spring 33 is such that a small pressure (of say, about 2 or 3 lbs. per square inch) is imposed on all that part of the oil circuit from the auxiliary outlet port 22 to the valve. Opening out of this pressure zone is a subsidiary drain pipe 35 fitted with a spill orifice 34. The lower end of the pipe 35 is led to the sump and should be spaced well away from the pump intake 24, for a reason referred to hereinafter.

A pipe 36 connects the pressure end of the bore 11 to the engine bearings (not shown) and a passage 37 provides communication between the right or neutral end of the cylinder and the auxiliary outlet 14 in order to allow oil which might otherwise be trapped between the cap 18 and the valve body 15 to escape when the control valve 15 is moved to the right. It likewise permits the passage of oil into the space between the cap 18 and the valve body as the control valve 15 is moved to the left under the influence of the spring 19.

The operation of this filtering system is as follows. When the system is started up oil is drawn by the pump 25 from the suction inlet 24 and delivered through the pipe 26 to the space in the filter casing surrounding the element. From here it passes through the element 4 to the outlet passages 9 and 10 and thence, via the port 12 and the pipe 36, to the bearings.

The amount of oil delivered by the pump is more than the bearings normally can accept, and hence the pressure in the outlet duct 36 and the pressure end of the bore 11 rapidly builds up to the designed figure at which it overcomes the resistance of the spring 19.

The valve 15 is accordingly moved to the right until the recess 21 opens communication between the pipe 23 and the relief outlet port 14 and pipe 27. Thus, after the desired pressure is reached any surplus oil is automatically relieved and passed back to pump suction without passing through the filter element. In this manner, the desired working pressure is constantly maintained on the bearings.

In its passage back to pump suction the relieved oil is resisted by the spring loaded valve 31 which unseats to allow it to pass but at the same time imposes a small pressure on that part of the system between itself and the outlet port 22.

Under the influence of this pressure, oil will flow through the spill orifice 34 into the pipe 35 and thence back to some part of the sump well removed from the suction inlet 24.

When starting up the engine the oil is cold and viscous and the amount demanded by the bearings is small compared with the total pumped and hence the amount relieved by the valve 15 is a large proportion of the whole.

Of this amount the amount which will spill out of the spill orifice 34 and flow into the sump through the return pipe 35 is also small. The greater volume of the oil will, therefore, pass back to the suction side of the pump 25 via the relief valve 31. The amount of oil contained in the circuit which includes the pump 25, pipes 23, 26 and 27, the annular recess 21, the port 22 and the space surrounding the filter element is comparatively small and, consequently, as the oil in it will be rapidly and repeatedly circulated many times before it escapes either to the bearings or to the spill orifice 34, it will become heated quickly, because the bulk of the pump energy is expended in friction which is converted into heat.

It will be apparent that an advantage of disposing the inlet to the pipe 23 adjacent to the bottom of the filter element is that the heated oil discharged from the pump 25 is thereby forced to flow over and in contact with a large proportion of the surface of the filter element 4, whereby the element is warmed and the oil can flow more freely through it.

As the temperature of the oil rises, it becomes less viscous and, hence, the quantity spilled through the orifice 34 and the pipe 35 increases.

The amount of the oil thus spilled has to be made up by the suction of fresh cold oil from the sump through the main inlet 24. Meanwhile, the oil in the sump is heated to some extent because, as aforesaid, the pipe 35 conducts heated oil from the spill orifice 34 into the sump in a locality spaced well away from the pump intake 24.

As mentioned above, when the engine is first started a small quantity of oil is repeatedly circulated and thereby quickly heated. Thereafter, as the temperature rises, more and more of the oil in the system is drawn into this small circuit and is thereby heated up and becomes less viscous.

With the heating of the bearings and of the oil, the bearings demand a greater amount of oil, consequently the amount necessary to be relieved and returned to pump suction by the control valve 15 is reduced and the latter will partially close by a movement to the left. Not only is the amount of oil relieved in this manner reduced, but also, as already stated, owing to its higher temperature, the amount which can spill through the orifice 34 increases. If it increases to an amount equal to or in excess of the reduced amount passed by the control valve 15, then all of the oil thus relieved will pass through the orifice and the relief valve 32 will completely close. It is to be noted, therefore, that in no circumstances whether the oil is hot or cold is any unfiltered oil allowed to reach the bearings.

The modified engine oil filtration system shown in Figs. 2 and 3 differs from that shown in Fig. 1, in that in addition to a main filter and its control unit, it also comprises an auxiliary filter unit and its associated auxiliary control valve unit. The main filter unit comprises a casing 38 fitted with a filter element 39 of known construction. The casing comprises a main oil inlet 40 disposed near the top of the filter element below the head 41, and a filtrate outlet 42 communicating with the interior of the filter element through a main outlet passage 43. A spring-urged non-return valve 44 is adapted to close the filtrate outlet 42 in certain circumstances. The filter casing is also provided with a secondary outlet 45 arranged to be closed by a spring-pressed, non-return valve 46. The system also includes an auxiliary filter unit comprising a casing 47 fitted with a filter element 48 of known construction. The casing is closed by a head 49 formed with an outlet passage 50 which communicates with the interior of the filter element at one end and with the filtrate outlet 51 at the opposite end. It will be noted that, as in the case of the main filter unit, the main oil inlet 52 is disposed near the top of the filter element just below the head. The filtrate outlet 51 is arranged to be closed in certain circumstances by a spring-pressed non-return valve 53. The filter casing is also provided with a secondary outlet 54 which is disposed near the bottom of the casing and is adapted to be closed by a spring-pressed non-return valve 55. This outlet is connected by the pipe 97 to the inlet 64 of the main control valve unit referred to hereinafter.

A pump 56 is arranged to withdraw oil from the engine sump (not shown) through a pump intake 57. The discharge side of the pump is connected by a pipe 58 to the inlet brach of the casing 59 of a three-way directing valve comprising a turnable three-way valve 60 formed with a straight-through passage 61 and a passage 62 at right angles thereto. One of the two outlets of the valve casing 59 is connected by a pipe 63 to the main inlet 40 of the main filter unit. The secondary outlet 45 of the main filter unit is connected to the inlet 64 of the cylinder 65 of a main control valve unit, and the opposed outlet 66 of the cylinder is connected by a pipe 67 to a casing 68 containing an apertured partition 69. The said partition is formed with a valve seat with which a spring-urged relief valve 70 is adapted to cooperate. A spill orifice 71 is provided in the wall of the casing 68 and is connected to the engine sump at a position remote from the pump intake 57 by a pipe not shown.

A control valve is slidably arranged in the cylinder 65, the said valve comprising at one end a piston 72 which is slidable in the pressure end of the cylinder. The piston is connected to a piston valve 73 by means of a piston rod 74. The piston valve is formed with an annular recess 77 which, in certain circumstances, is adapted to connect the inlet and outlet ports 64 and 66, and is also provided with a passage 78 which connects the space between the piston and valve, to the neutral end of the cylinder. An outlet 79 from the cylinder provides communication between the neutral end of the cylinder and the sump. In this manner the space between the piston and piston valve is directly connected to the sump and any leakage of unfiltered oil that may take place past the piston valve 73 is drained away to the sump and cannot accumulate and ultimately find its way past the piston 72 to the bearings. A spring 76, bearing on the underside of the piston valve constantly urges the piston and the piston valve upwards in the cylinder towards the pressure end and thereby brings the annular recess 77 out of register with the ports 64 and 66 closing off communication between them. The pressure end of the cylinder is also provided with a connection 80 communicating with a pipe 81 which is in communication with the filtrate outlet 42 and with a pipe 82 connected with the engine bearings. The bearing pressure is thereby communicated to the piston end of the control valve.

The right hand outlet from the casing of the three-way valve communicates through a pipe 83 with the inlet 84 of the cylinder 85 of an auxiliary control valve unit which is somewhat similar in construction to the main valve unit described above. The cylinder is also provided with an outlet 86 which is opposed to the inlet 84 and is connected to the main inlet 52 of the auxiliary filter unit. A control valve is slidably arranged within the cylinder 85 and comprises a piston 87 and a piston valve 88 which are connected by means of a piston rod 89. A spring 91 arranged on top of the piston 87 constantly urges the latter and the piston valve 88 downwards towards the valve end of the cylinder. An annular recess 92 is formed in the piston valve 88 and, in certain circumstances, is arranged to put the inlet port 84 and the outlet port 86 into communication.

Below the valve 88, the valve end of the cylinder 85 is put into communication with the inlet side of the main filter by means of the pipes 93, 83 and 63.

The filtrate outlet 51 of the auxiliary filter unit is connected by means of a pipe 94 to the pipe 82 leading to the bearings, and the space above the piston 87 of the auxiliary valve unit is connected by the pipes 95 and 82 to the bearings. The bearing pressure or, in other words, the outlet pressure from the main filter, is thereby communicated to the piston end of the auxiliary control valve, and since, as has already been explained, the valve end is connected to the inlet pressure of the main filter, it follows that the auxiliary control valve is sensitive to, and operates in accordance with, the pressure difference across the main filter, i. e., the difference between the pressures at the inlet and outlet of the main filter. The space between the piston 87 and the piston valve 88 in the cylinder 85 communicates with the engine sump through a pipe 96 in such a way that any leakage of unfiltered oil past the piston valve 88 is drained away to the sump and cannot accumulate and ultimately find its way past the piston 87 and via the pipes 95, and 82 to the bearings. The secondary outlet 54 of the auxiliary filter unit is connected to the inlet 64 of the main filter control unit by means of a pipe 97, as mentioned above.

Fig. 3 shows the positions of the two control valves in normal circumstances when the oil is hot. Assuming that the oil is cold, however, and that the three-way valve 60 is set in the position shown in Figure 2, oil drawn up by the pump 56 from the sump through the intake 57 is forced by the pump through the pipes 58 and 63 and through the main inlet 40 into the filter casing 38 in the annular space between the casing and the filter element. A certain proportion of the cold oil will be forced through the filter element 39 and thence through the passage 43 and the filtrate outlet 42 to the bearings via the pipes 81 and 82. The pressure of this oil is communicated to the pressure end of the cylinder 65 above the piston 72 through the pipe 80 and when it reaches the predetermined figure it forces the piston downwards against the pressure of the spring 76 in such a manner as to bring the annular recess 77 in the piston valve 73 into register between the inlet and outlet ports 64 and 66, so that excess oil not required by the bearings can flow from the filter casing 38 past the secondary outlet valve 45 into the cylinder 65, through the annular recess, out of the cylinder and through the pipe 67 into the casing 68 of the relief valve 70. The pressure of the spring acting upon the relief valve 70 opposes a small back pressure, of say about 2 or 3 lbs. per square inch. The arrangement is such that when the oil is cold only a very small quantity will spill from the casing 68 through the spill orifice 71 back into the sump, the greater volume passing through the valve 70 directly back to pump suction.

Owing to the difference between the pressure of the oil flowing from the pump 56 through the pipes 83 and 93 to the valve end of the cylinder 85 of the auxiliary valve unit and the pressure of the oil in the pipe 95, which is lower than the pump pressure by the amount of the pressure drop through the main filter element 39, and which when the oil is cold is high, the piston 87 is forced upwards from the position of Fig. 3 to that of Fig. 2, against the action of the spring 91, in such a manner that the annular recess 92 in the piston valve is brought into register with and then provides communication between the opposed inlet and outlet ports 84 and 86. When this happens, oil from the pipe 83 can flow through the port 84, recess 92 and port 86 to the main inlet 52 of the auxiliary filter unit, and thence into the casing 47. Part of this oil is forced through the filter element 48 and part flows over and around the filter element and downwardly in the casing. The oil that flows through the filter element 48 passes through the passage 50 and the filtrate outlet 51 and past the non-return valve 53 into the pipes 94 and 82 and thence to the bearings. The excess oil not required by the bearings flows from the casing through the secondary outlet 54 past the lightly sprung valve 55 and through the pipe 97 to the inlet port 64 of the main control unit cylinder 65, so that when the port of the latter opens both filters are relieved substantially equally. The amount of oil contained in the space around the two filter elements 39 and 48 and in the pipes 58, 63, 67, 83 and 97 is relatively small so that being rapidly and repeatedly circulated it quickly becomes heated due to the conversion of the pump energy into friction heat.

As the bearings and the oil feed thereto become heated, a greater quantity of oil can pass through the filter elements 39 and 48 and less oil is returned to the suction side of the pump from the filter casings. In due course, as the temperature of the system rises to its designed figure the pressure difference across the main filter becomes very much less than originally and the difference in the pressure of the oil in the piston end of the cylinder 85 above the piston 87 and that below the piston valve 88 also becomes correspondingly less. The pressure of the spring 91 then forces the auxiliary control valve downwards so that the ports 84 and 86 of the cylinder 85 are masked by the piston valve 88, see Fig. 3. The flow of oil to the auxiliary filter casing is then cut off and the non-return valves 53 and 55 will close. Owing to the decrease in the back pressure developed at the bearings, due to the heating of the oil, the pressure of the oil in the pressure end of the cylinder 65 of the main valve unit is eventually overcome by the opposing pressure of the spring 76. The piston 72 and the piston valve 73 are then forced upwards into the position shown in Fig. 3, in which the ports 64 and 66 are masked or partially masked by the piston valve, such that the requisite quantity of oil passes to the main bearings and only the unrequired balance is spilled via the secondary outlet.

By providing the system with a three-way directing valve such as 60 it becomes possible to remove the filtering element of either the main filter or the auxiliary filter from its casing, e. g., for cleaning, while the other filter is still in operation. Thus, if the valve 60 is turned into a position in which the straight-through passage 61 is vertical and the branch 62 is horizontal and directed towards the pipe 83 no oil from the pump can reach the main filter unit. Some of the oil flowing through the pipe 83 will pass from the latter into the valve end of the cylinder 85 and will act to raise the piston valve 88 and the piston 87, thereby putting the inlet port 84, the annular recess 92 and the outlet port 86 into communication. Thereupon, the oil will flow into the filter casing 47, through the filter element 48, through the passage 50, through the filtrate outlet 51 and through the pipes 94 and 82 to the bearings. Any excess of oil over and above the amount required to maintain the designed pressure at the bearings will pass out through the secondary outlet 54 being released by the action of the main control valve 73. Any such oil would be prevented from entering the main filter unit casing 38 by the non-return valve 46 and no oil can enter the casing 38 from the pipe 81 because of the closing of the main filter outlet non-return valve 44 so that the main filter unit is completely isolated, and can thus be opened.

When the three-way directing valve 60 is turned to the position in which the straight-through passage 61 is vertical, but the passage 62 is directed towards the pipe 63, no oil from the pump can enter the auxiliary filter unit. The pressure of any oil that may enter the pipe 97 from the main filter casing 38 will act to keep the non-return valve 55 of the auxiliary filter unit closed, and the pressure of the oil in the pipe 94 will also act to keep the filtrate outlet non-return valve 53 closed, so that the auxiliary filter unit is completely isolated, and can thus be opened.

It will be appreciated that while the oil filtration system provided by this invention is particularly applicable for filtering the oil of internal combustion engines, nevertheless it can be used for other purposes, such as filtering the lubricating oil of any machinery having forced lubrication systems.

It will be understood that although the invention has been specifically described with reference to filter units in which the oil flows from the outside of the filter element to the interior thereof, the invention is equally applicable to other types of filter unit in which the oil to be filtered may be fed to the inside of the filter and flow outwards or may flow axially or in any convenient manner through the filter element.

It will also be understood that the filtration system could include two or more main filter units and two or more auxiliary filter units, each with its associated control valve unit. Further, all the filter units and their control valve units could be provided in the same casing, in which case, obviously, much of the connecting piping shown in Figs. 2 and 3 would be eliminated.

I claim:

1. An oil filtration system comprising a source of oil supply, means for circulating oil through the system, a filter including a filter casing and having a filter element contained therein, an inlet port, a conduit connecting said inlet port with the outlet of said circulating means, a filtrate outlet port, a second conduit connecting said filtrate outlet port to the place of use of the oil, an outlet port for unfiltered oil, a third conduit connecting said unfiltered oil outlet port with the inlet of said circulating means, valve means in said third conduit connected to open under pressure developed at said filtrate outlet port, a spring loaded relief valve in said third conduit, and a by-pass conduit connecting said third conduit at a point between said unfiltered oil outlet and said relief valve with said source of oil, whereby unfiltered oil will be recirculated and cold, highly viscous oil will be passed by said relief valve to the inlet of said circulating means and heated oil will be by-passed through said by-pass conduit to said source of oil.

2. An oil filtration system comprising a source of oil; a filter unit; said filter unit including a casing, a filter element positioned in said casing, an oil inlet port in said casing, a filtrate outlet port on the filtrate side of said filter element which is opposite said inlet port, a second outlet port on the unfiltered oil side of said filter element which is on the same side of said filter element as said inlet port, and means responsive to the oil pressure developed at said filtrate outlet port to open and close said second outlet port; circulating means; a conduit connecting the outlet of said circulating means with said inlet port; a second conduit connecting the inlet of said circulating means with said second outlet port to permit recirculation of unfiltered oil; a pressure relief valve in said second conduit resisting the flow of oil therethrough; and a by-pass conduit connecting said second outlet port to the source of oil to by-pass thereto oil not passed directly to the inlet of said circulating means through said pressure relief valve.

3. The combination set forth in claim 1, in which said filtrate outlet conduit and said third conduit are both provided with non-return valves.

4. An oil filtration system comprising a main filter unit and an auxiliary filter unit, each of said units having a casing, a filter element therein, an inlet port, a filtrate outlet port, and a second outlet port for unfiltered oil, an oil circulating means, a first conduit connecting the outlet of said circulating means with said inlet port of said main unit, a second conduit connecting the outlet of said circulating means with said inlet port of said auxiliary unit, a filtrate conduit connecting both said filtrate outlet ports with the place of oil use, a conduit connecting both said second outlet ports in series, a third conduit connecting said last-mentioned conduit with the inlet to said circulating means thereby to recirculate unfiltered oil, and a pressure responsive means connected to said filtrate conduit and to said third conduit selectively to utilize one or all of said units depending upon the pressure developed in said filtrate conduit.

5. The combination set forth in claim 4, in which said selection means includes a slide valve, said slide valve comprising a cylinder, a piston valve body slidable therein, a connection between the piston end of said cylinder and said filtrate conduit, and said valve end of said cylinder being located in said third conduit to control the flow of oil to the inlet of said circulating means.

6. The combination set forth in claim 4, wherein there is provided an auxiliary unit control valve comprising a cylinder, having an inlet port connected to the outlet of said circulating means and an outlet port connected to said inlet port of said auxiliary unit, a double piston valve formed with an annular recess therein and slidable in said cylinder, a connection between the first piston end of said cylinder and said filtrate conduit, and a connection between the opposite end of the cylinder and the outlet of said circulating means whereby said valve is caused to open when the balance of total pressure on said piston valve is upset by excessive pressure at said valve inlet.

7. The combination set forth in claim 4, in which a three-way directing valve is positioned in said conduit connecting the outlet of said circulating means with both said inlet ports of said filter units.

8. An oil filtration system comprising a source of liquid supply, a casing having an inlet port, a filtrate outlet port, and a second outlet port for unfiltered liquid, a filter in said casing between said inlet port and said filtrate outlet port, first movable valve means controlling the flow of liquid through said second outlet port, means constantly urging said movable valve means toward one position to prevent the flow of unfiltered liquid through said second outlet port, means operated by the liquid which has passed through said filtrate outlet port constantly urging said movable valve means to a position to permit the flow of unfiltered liquid through said second outlet port, a first conduit connecting said source of liquid supply to said inlet port, a pump in said conduit for forcing liquid from said source through said conduit and inlet port into said casing and through said filter element and said filtrate outlet port and also through said second outlet port when said movable valve means is moved to a position to uncover the latter, a second conduit connecting said second outlet port to said first conduit at a point between said source and the inlet to said pump, a pressure operable valve in said second conduit between said second outlet and the point of junction with said first conduit, said pump building up pressure in said conduit, and a spill orifice in said second conduit on the pressure side of said pressure operable valve and leading to said source of liquid supply for diverting at least a portion of the liquid directly to said source when the pressure in said conduit is insufficient to actuate said pressure operable valve to fully open position.

9. The combination set forth in claim 8, which also includes at least one auxiliary filter unit comprising a casing having an inlet port adapted to be connected to said pump, a filtrate outlet port adapted to be connected to said first filtrate outlet port, and a second outlet for unfiltered liquid adapted to be connected to the inlet port of said first movable valve means, a filter in said casing between said inlet port and said filtrate outlet port, and second movable valve means controlling the flow of unfiltered liquid into said auxiliary casing, said second movable valve means having means operated by the liquid which has passed through said filtrate outlet ports constantly urging said valve means to closed position to prevent the flow of unfiltered liquid into said auxiliary filter casing and also having means operated by the pressure of the liquid at the outlet side of said pump operating against the pressure developed at said filtrate outlet ports, whereby said second movable valve means is closed when the pressure of the liquid at said filtrate outlet ports exceeds a predetermined amount relative to the pressure of the liquid fed to said auxiliary casing from said pump.

CAMILLE CLARE SPRANKLING LE CLAIR.

REFERENCES CITED

The following references are of record in the file of this patent:

UNITED STATES PATENTS

| Number | Name | Date |
|---|---|---|
| 1,020,774 | Nilson | Mar. 19, 1912 |
| 1,619,118 | Guy et al. | Mar. 1, 1927 |
| 1,703,335 | Bower | Feb. 26, 1929 |
| 1,913,401 | Liddell | June 13, 1933 |
| 1,913,402 | Liddell | June 13, 1933 |
| 1,948,479 | Caminez | Feb. 20, 1934 |